United States Patent [19]

Roberts

[11] Patent Number: 4,593,451

[45] **Date of Patent: * Jun. 10, 1986**

[54] APPARATUS FOR CLEANING LARGE PIPE THREADS

[76] Inventor: Royce G. Roberts, P.O. Box 1296, Kenai, Ak. 99611

[ * ] Notice: The portion of the term of this patent subsequent to Apr. 21, 1998 has been disclaimed.

[21] Appl. No.: 477,027

[22] Filed: Mar. 21, 1983

Related U.S. Application Data

[63] Continuation-in-part of Ser. No. 414,989, Sep. 3, 1982, which is a continuation of Ser. No. 197,895, Oct. 17, 1980, abandoned, which is a continuation of Ser. No. 965,908, Dec. 4, 1978, Pat. No. 4,262,410.

[51] Int. Cl.³ .......................... B08B 9/02; B23P 19/04

[52] U.S. Cl. ...................................... 29/560; 29/33 T; 29/240; 81/57.2; 81/57.33; 279/109; 279/118; 294/106; 414/776; 15/104.04

[58] Field of Search ..................... 29/81 F, 81 J, 81 H, 29/560, 33 T, 240; 15/88, 104.1 R, 104.03, 104.04, 104.05, 104.09; 10/132; 408/35; 414/730, 776; 294/88, 106, 115; 279/4, 7, 106, 107, 109, 118; 81/57.15, 57.19, 57.2, 57.31, 57.33

[56] References Cited

U.S. PATENT DOCUMENTS 4,262,410 4/1981 Roberts ................................ 29/560

*Primary Examiner*—Z. R. Bilinsky

*Attorney, Agent, or Firm*—Marcus L. Bates

[57] ABSTRACT

Apparatus for cleaning each threaded marginal end portion of large pipe. The apparatus has a cleaning head assembly which includes a rotatable member having circumferentially spaced cleaning brushes adjustably mounted thereon so that the cleaning brushes can engage and clean the opposed pipe surface at the opposed marginal terminal ends of a joint of pipe. Spaced plate-like members are axially arranged along a common shaft, and the opposed faces of the plate members have the cleaning brushes adjustably mounted thereto and arranged so that the common shaft can be rotated in a horizontal plane, thereby bringing the brushes of one of the plate members into cleaning engagement respective to the pipe threads, and thereafter the assembly is rotated 180°0 in a horizontal plane, thereby bringing the other set of brushes into cleaning relationship respective to the opposed pipe end. In another preferred form of the invention, the cleaning apparatus is combined with a pipe protector remover apparatus, all of which is mounted to a main frame. The main frame can be moved vertically, laterally, and longitudinally respective to a pipe. The main frame is rotatable about a vertical axis so that either the protector remover or the cleaning apparatus can be brought into operative relationship respective to either end of a pipe.

15 Claims, 12 Drawing Figures

FIG. 3
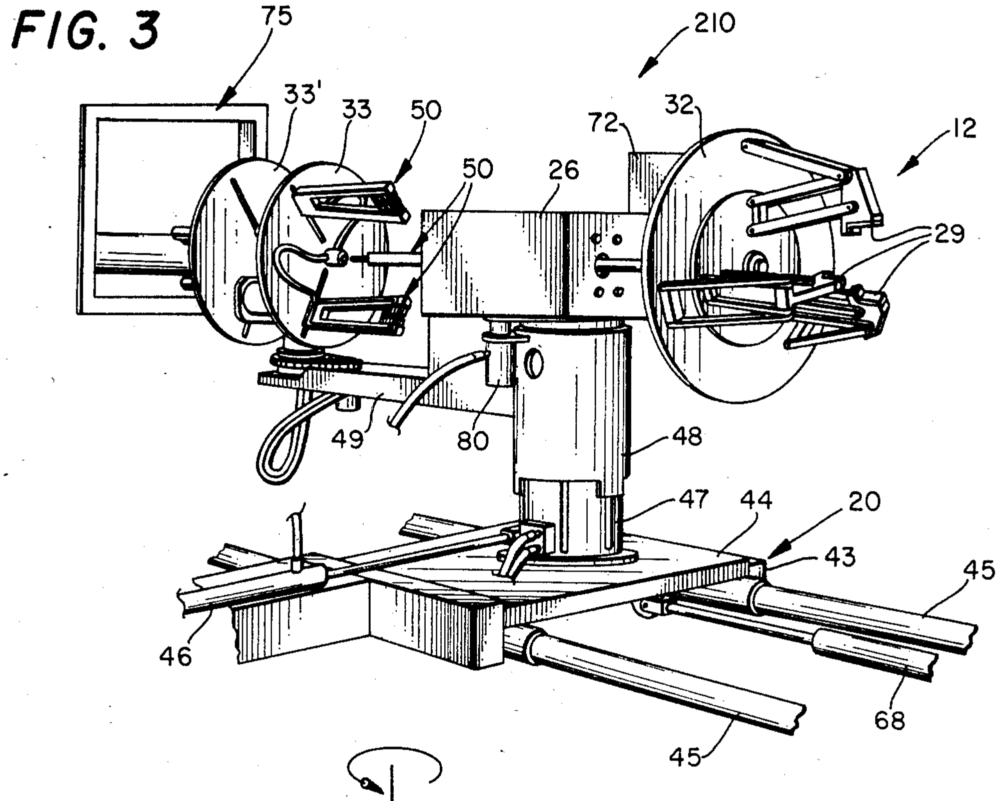
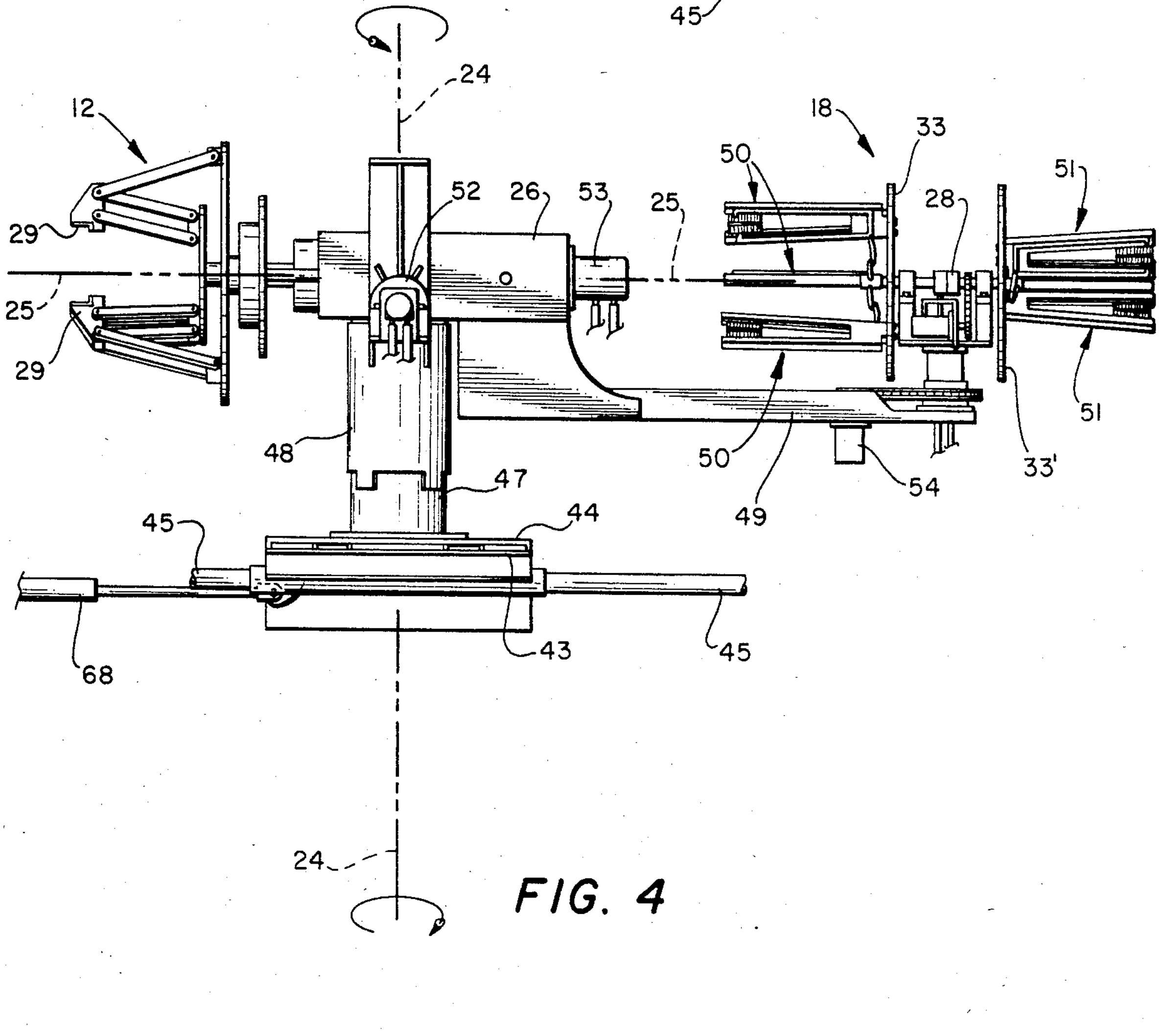
FIG. 4

APPARATUS FOR CLEANING LARGE PIPE THREADS

RELATED PATENT APPLICATIONS

This application is a continuation in part of my previously filed patent application Ser. No. 414,989 filed Sept. 3, 1982 which in turn is a continuation of patent application Ser. No. 197,895 filed Oct. 17, 1980, now abandoned; which in turn is a continuation of Ser. No. 965,908 filed Dec. 4, 1978, now U.S. Pat. No. 4,262,410 issued Apr. 21, 1981.

BACKGROUND OF THE INVENTION

Oilfield pipe, especially drill pipe, casing, and production tubing, is handled many times during its life. Various different configurations of pipe are therefore used in the oilfield. The pipe must occasionally be removed from a borehole, which necessitates breaking the pipe down into its individual joints, so that the pipe can be suitably stored until needed, and then again used at another well location.

Most oilfield pipe is very expensive and therefore economics demand that considerable effort be invested in cleaning, inspecting, and preserving pipe, thereby elongating its life and effecting a considerable savings everytime the pipe is subsequently used at another well location.

The most critical part of a pipe joint is the threaded marginal ends. Some pipes have a box and pin ends, that is, a male thread formed at one marginal end of the pipe and a female thread formed internally at the opposed marginal pipe end. When the threads become unduly damaged, it is necessary to cut off at least part of the marginal threaded end of the pipe and form new threads thereon. The threaded pipe ends therefore must be protected from the deliterious effects of the environment, and since it is common to store pipe outside on pipe racks, there is good reason that the pipe must be properly protected.

One of the most time consuming and distasteful jobs associated with the handling of oilfield pipe is the necessary occasional cleaning and preserving of the threaded ends. Various different tools have been proposed for reducing the amount of manual labor associated with this aspect of pipe handling, as for example, Toelke, U.S. Pat. No. 4,011,617 discloses a housing having opposed outwardly opening chambers within which rotating brush assembles are mounted for engagement with the pin and box end of pipe joints. The apparatus generally is used in conjunction with a drilling rig, and is manually manipulated by the workmen as pipe goes into or comes out of a borehole.

Scott, U.S. Pat. No. 4,014,062 discloses a thread cleaner having a rotatable brush means mounted for engagement with the pin end of a pipe which engages and cleans the threads thereof. The pipe end is submerged in cleaning fluid during the cleaning operation.

Reference is made to my previous U.S. Pat. No. 4,262,410 issued Apr. 21, 1981; and my copending patent application Ser. No. 414,989 filed Sept. 3, 1982; and to the art of record therein for further background of this invention.

SUMMARY OF THE INVENTION

This invention is to an apparatus for sequentially cleaning the ends of a joint of pipe. Spaced rotatable members, preferably in the form of circular plates, are attached to a rotatable shaft, with the axial centerline of the shaft being aligned with the center of the plates.

The opposed faces of the plates are provided with a plurality of pairs of cleaning brushes which are radially spaced from the shaft and circumferentially spaced respective to one another. The pairs of cleaning brushes are adjustably fixed to the plate faces and can be moved towards and away from one another so as to enable the brushes to cleaningly engage the marginal terminal ends of various different size of large pipe.

Each pair of brushes are arranged with the cleaning surface thereof confronting one another and converging towards one another in a direction towards the plate member, with there being an inner and outer brush for concurrently engaging the inner and outer pipe wall surfaces of either pipe end.

The shaft which connects the plates together is jounaled to a housing, and the housing is supported in journaled relationship to a vertical support member in a manner which enables the horizontally disposed shaft to be rotated in a horizontal plane, thereby rotating the plate members 180° in the horizontal plane so that the brushes associated with one plate member can be rotated 180° out of the way while the brushes associated with the other plate member is brought into operative position respective to the end of a pipe. Cleaning fluid and power fluid is conducted through the housing and is suitably connected to conduct power fluid to and from a motor, while cleaning fluid is conducted through the shaft and to the brushes.

In another form of the invention, a thread protector remover apparatus is used in combination with the cleaning apparatus. The thread protector remover, some of the details of which are set forth in my above mentioned issued patent, is mounted at one end of a main frame, with the cleaning apparatus being mounted at the other end of the main frame. The main frame is pivotally mounted along a vertical axis for rotation in a horizontal plane. The main frame is mounted to a track means which enables the entire main frame to be moved laterally respective to a pipe. Elevating means is interposed between the main frame and the track means to enable the main frame to be elevated vertically. The track means is slidably mounted in captured relationship on a second lateral track means, thereby enabling the apparatus to be moved longitudinally respective to the pipe to be cleaned. This combination of elements enables the thread protector remover or either of the brushes to be axially aligned with one end of the pipe.

Accordingly, a pipe is positioned in close proximity of the apparatus, the thread protector remover device is brought into proper alignment with the end of the pipe, the apparatus removes the protector from the pipe end, the main frame moves away from the pipe end and is rotated to bring the proper cleaning apparatus adjacent to the pipe end, while the appropriate set of brushes is simultaneously rotated into operative relationship respective to the pipe threads. The plate members of the cleaning apparatus rotate as the cleaning brushes are forced to simultaneously engage the inside and outside wall surfaces of the pipe. Cleaning fluid is conveyed onto the brushes and pipe threads during the cleaning operation. The apparatus is next retracted from the immediate proximity of the pipe and moved laterally away from the longitudinal axis of the pipe, and the pipe is then moved past the main frame. During this last operation, the pipe is supported by a roller attached to the main frame. This action presents the opposed end of the pipe to the apparatus, whereupon the above manipulative action is performed to the remaining threaded end of the pipe.

A primary object of the present invention is the provision of an improved cleaning apparatus by which the marginal terminal ends of tubular goods are cleaned.

Another object of the invention is the provision of a cleaning apparatus comprising rotatable brush means which simultaneously engage the inner and outer marginal ends of a pipe joint to thereby simultaneously clean the interior and exterior wall surfaces thereof in a new and unusual manner.

A further object of the prevent invention is the provision of a cleaning apparatus having pairs of brushes circumferentially spaced about a member with the brushes confronting one another and lying along a diameter substantially equal to the mean diameter of the marginal pipe end to be cleaned so that the confronting brushes simultaneously engage the inner and out marginal peripheral surfaces of a pipe to be cleaned.

A still further object of this invention is to a pipe cleaning apparatus comprising a first and second cleaning brush assembly for sequentially engaging marginal ends of a pipe having ends of different diameters.

Another and still further object of this invention is the provision of a combination of a cleaning apparatus and a thread protector remover apparatus, both mounted to a main frame and arranged to be moved longitudinally, laterally, and vertically respective to a joint of pipe to be cleaned, and further including means by which either end of the main frame can be moved into operative position respective to either pipe end.

An additional object of the present invention is the provision of method and apparatus for removing a thread protector from the end of a pipe joint, and thereafter engaging one of the ends of the pipe joint with a thread cleaning apparatus, and thereafter engaging the other end of the pipe joint with a thread protector remover apparatus, and thereafter cleaning the other end of the pipe joint.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

BRIEF DESCRIPTION OF THE DRAWINGS

FIG. 3 is a three quarter, front perspective view of apparatus made in accordance with the present invention, with some parts being broken away therefrom for convenience;

FIG. 4 is a broken, side elevational view of the apparatus disclosed in FIG. 3;

DETAILED DESCRIPTION OF THE PREFERRED EMBODIMENTS

Figure 1:
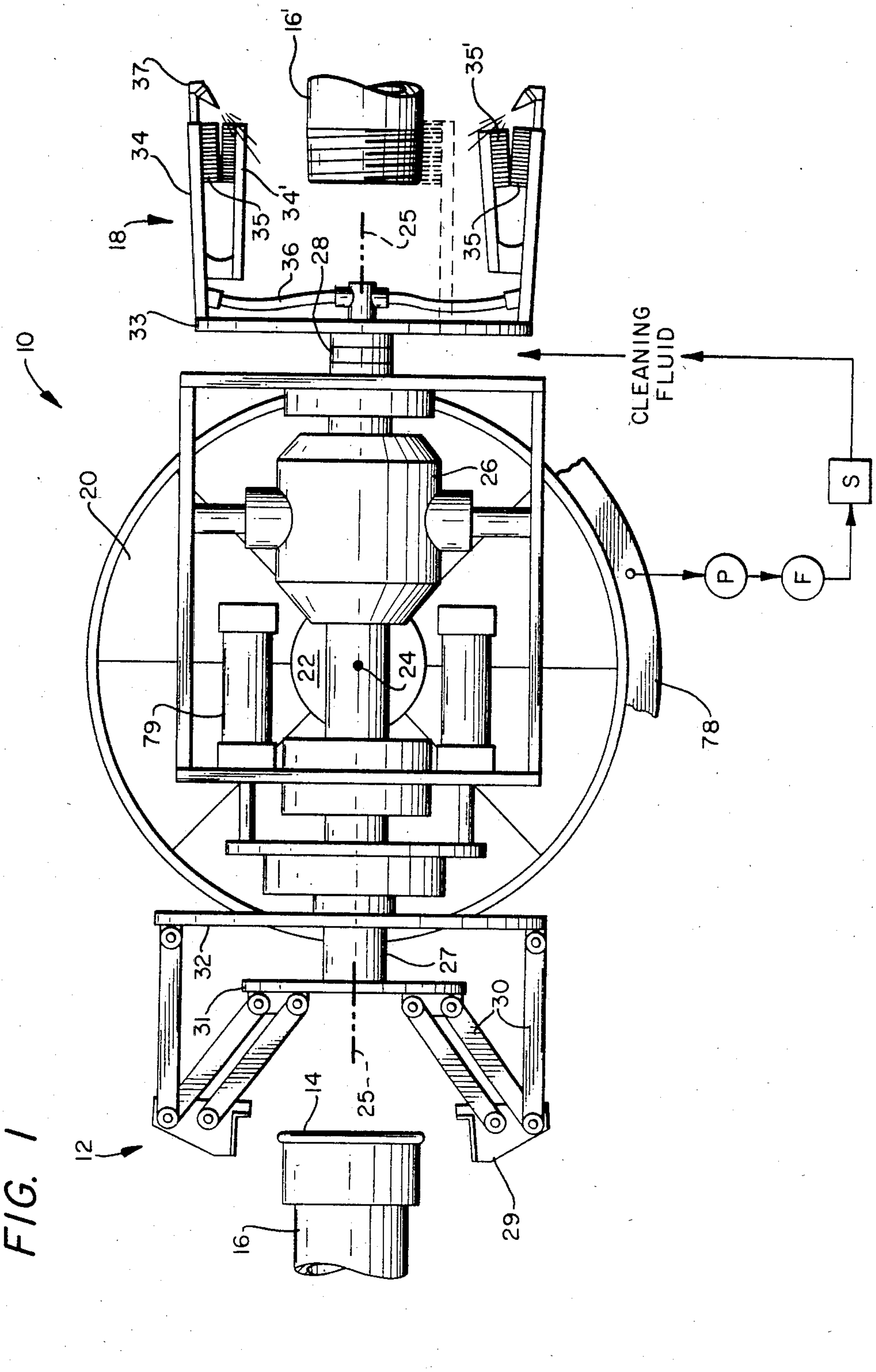
FIG. 1 is a part diagrammatical, part schematical, top plan view of a combination pipe thread protector remover and cleaning apparatus made in accordance with the present invention, with some parts being broken away therefrom.

In FIG. 1 of the drawings, there is diagrammatically illustrated apparatus 10 made in accordance with the present invention. The apparatus includes a pipe thread protector remover device or tool 12 located at one end thereof for removing a thread protector 14 from the marginal terminal end of a joint of pipe 16. The apparatus further includes a thread cleaner device 18 mounted in opposition to the protector remover apparatus. A base support 20 rigidly supports a central column 22 in a manner which permits the entire apparatus 12 and 18 to be rotated in a pivotal manner about a vertical, central axis 24. Numeral 25 illustrates the longitudinal axis of the combination. The longitudinal axis 25 is horizontally disposed and longitudinally aligned with the axial centerline of the pipes 16 and 16'. Motor 26 drives a centrally located drive shaft 27. A fluid coupling 28 transfers cleaning fluid from proximity of column 22 to the rotating brush assembly, as will be more fully appreciated later on as the remainder of this disclosure is digested.

Throughout the various figures of the drawings, the pipe protector remover is seen to include a plurality of jaws 29 which are radially spaced from the drive shaft 27. The jaws are circumferentially spaced respective to one another, and each jaw is attached to the distal end of a pair of coacting arms 30, with the pivotal ends of the arms being attached to spaced plate members 31 and 32. The plate members are movable towards one another, causing the jaws 29 to move radially towards one another, thereby releasably engaging various different sizes or diameters of the protector 14, as is more fully pointed out in my U.S. Pat. No. 4,262,410.

Figure 2:
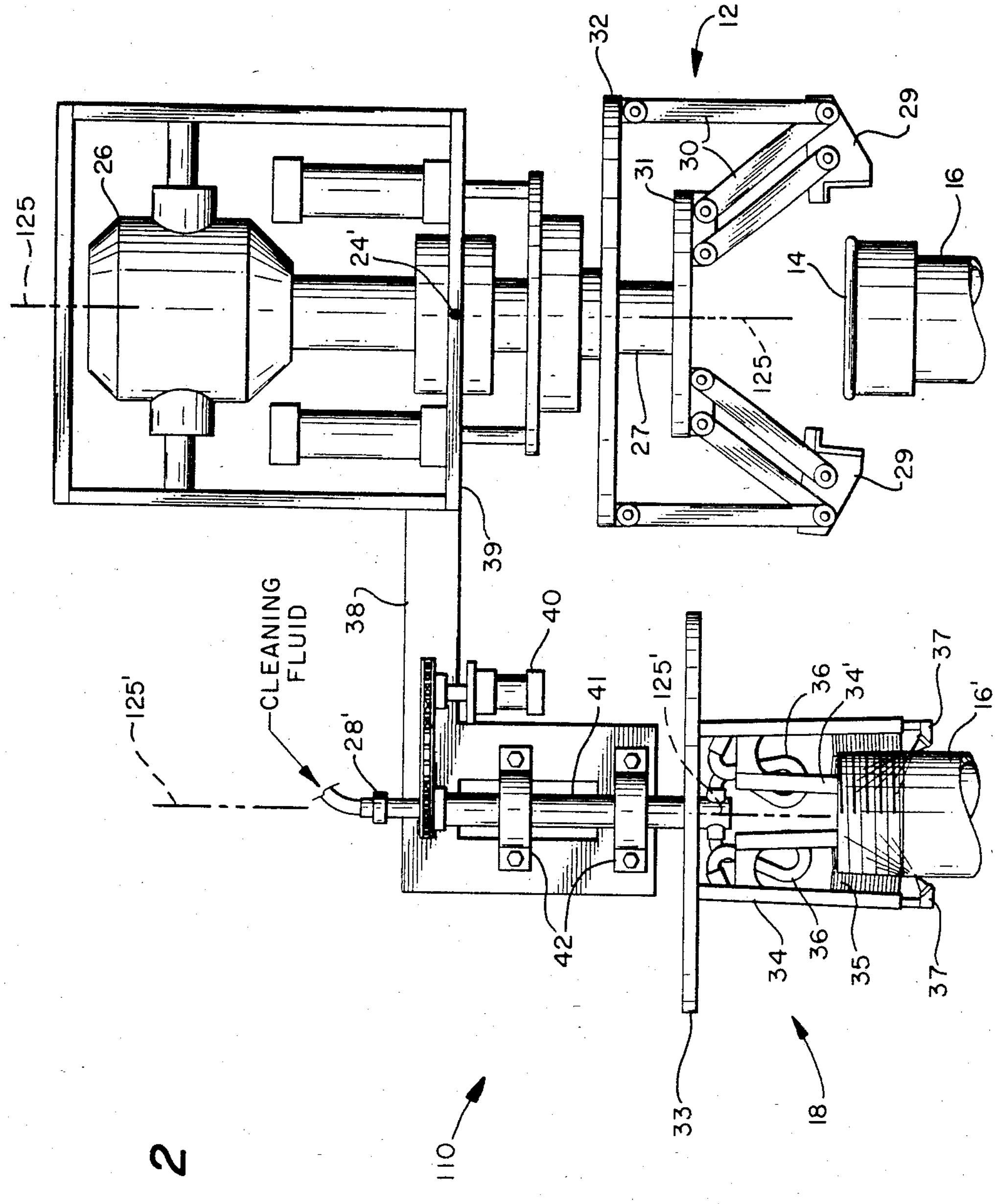
FIG. 2 is a top plan view showing a modification of the apparatus disclosed in FIG. 1.

In FIGS. 1 and 2, the illustrated thread cleaner device 18 is seen to include a rotatable plate member 33 to which a fixed end of a plurality of pairs of arms 34 and 34' are attached. The pairs of arms are circumferentially spaced about the plate member, and radially spaced from centerline 25. The free marginal end of the arms 34 have brushes 35 attached thereto, with the brushes 35 and 35' confronting one another so that the inner and outer marginal terminal end of a pipe can be forcibly received therebetween.

As best seen in FIG. 1, together with other figures of the drawings, a suitable cleaning fluid is forced by pump P to flow through filter F, to a reservoir S and onto the fluid coupling 28 where the cleaning fluid flows into a number of radial conduits 36 and to nozzles 37, where the cleaning fluid is forced to spray onto the brushes as they engage the opposed pipe surfaces at the marginal end of the pipe.

In the modification set forth in FIG. 2, a support plate 38 forms part of the main frame and is arranged for supporting the protector remover and the thread cleaner apparatus. The frame at 38 supports the thread cleaner while the frame at 39 supports the protector remover. Hydraulic motor 40 drives a shaft 41 which in turn rotatably drives the before mentioned plate member 33. The shaft 41 is rotatably mounted respective to a set of spaced pillow block bearings 42.

As previously mentioned in conjunction with the embodiment of FIG. 1, the combination protector remover tool and thread cleaner is rotatably supported for rotation about a vertical centerline 24, which in the embodiment of FIG. 2, the combination is supported for rotational motion in a horizontal plane about vertical centerline 24'.

FIGS. 3–12 set forth the preferred embodiment of the invention, which includes the before mentioned pipe protector remover device 12 arranged in axially aligned relationship respective to a thread cleaner 18. The cleaner and remover are mounted in opposition to one another and along a common longitudinal centerline. Hence, the plate members 32, 33, and 33' are spaced from one another and have an axis which lies along a common horizontally disposed longitudinally extending centerline. The apparatus of FIGS. 3–12 is supported from a longitudinally movable support plate 43. The support plate 43 slidably receives a superimposed laterally movable plate member 44. Plate members 43 and 44 are captured respective to one another so that relative lateral movement can occur therebetween.

Tubular rails 45 are fixed respective to a floor or foundation. Hydraulic clyinder 46, when actuated, moves the plate member 44 respective to the plate member 43. Plate member 43 is slidably captured to the rail 45 and enables both plate members 43 and 44 to be moved longitudinally of the pipe in response to actuation of a hydraulic cylinder assembly 68.

A rigid column 47 is attached to the laterally movable plate member 44. Housing 48 forms an elevator by which the entire main support frame 49 is elevated vertically respective to column 47 by means of a hydraulic cylinder arrangement (not shown).

In FIGS. 3 and 4, the numeral 50 indicates a small diameter brush assembly which is adjustably affixed to plate member 33, in a manner similar to the before mentioned brush assemblies seen at 34 and 35 in FIG. 1, for example. The large diameter brush assembly 51 is adjustably affixed to plate member 33'.

As particularly illustrated in FIGS. 4 and 11, a pipe receiving roller 52 is supported by the main frame 49 for delivering a pipe from one side of the apparatus to the other side thereof as will be more fully appreciated later on in this disclosure.

In FIG. 4, hydraulic fluid is connected at 53 for moving the plate members which actuate the jaws 29 of the pipe thread protector remover device.

Figure 5:
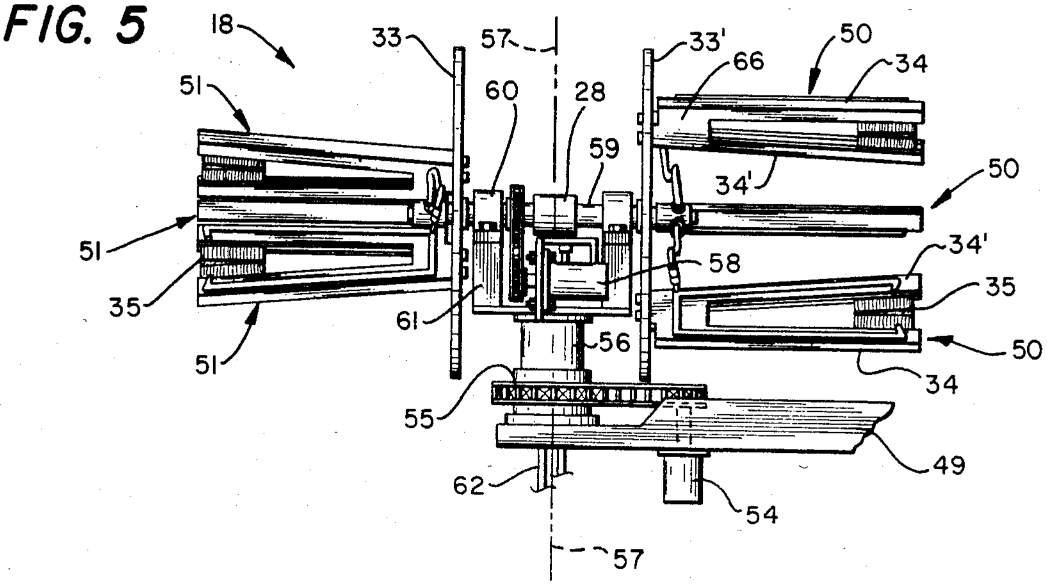
FIG. 5 is a fragmentary, side elevational view of part of the apparatus disclosed in some of the foregoing figures.

In FIG. 5, hydraulic motor 54 is supported from frame 49 and drives sprocket 55 by the illustrated chain drive. Rotatable housing 56 is directly connected to and rotated by sprocket 55. The housing 56 is rotated about the vertical axis 57 by the action of the drive train 54, 55. Motor 58 drives shaft 59 by means of the illustrated chain drive assembly, thereby concurrently rotating the plate members 33 and 33', which in turn directly drive the circumferentially extending pairs of brushes attached thereto. Pillar block bearings, one of which is indicated by numeral 60, are mounted to the illustrated spaced yokes, one of which is indicated by numeral 61. The yokes are attached to the column 56. A plurality of hoses 62 extends up through the interior of the rotatable housing 56 and are suitably connected to supply fluid for the motor 58, as well as cleaning fluid for the brushes.

Figure 6:
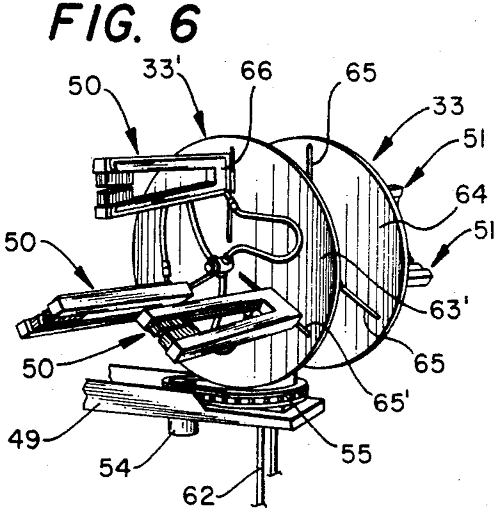
FIG. 6 is a reduced perspective end view illustrating some features of the apparatus disclosed in FIG. 5.

In FIG. 6, numeral 63' indicates the outer face of plate member 33'. Numeral 64 indicates the inner face of plate member 33. Radial slots 65 and 65', respectively are formed in plate members 33 and 33', respectively, and adjustably receive the connected ends 66 of the paired brush assemblies 50, for example.

Figure 10:
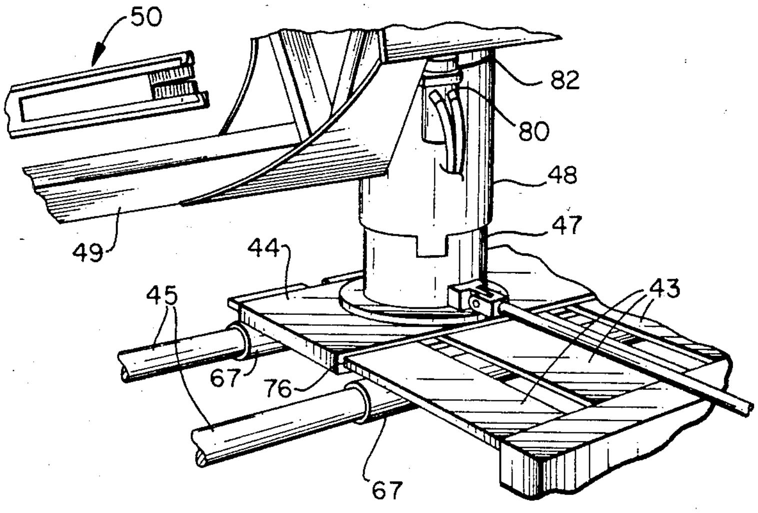
FIG. 10 is a fragmentary, perspective view of part of the apparatus disclosed in FIGS. 3 and 4.

In FIG. 10, numeral 67 indicates a sleeve which is slidably received about a marginal exterior surface of the tubular rails 45. The sleeves are spaced apart and connected at opposed ends of the plate 43 with there being two spaced sleeves for each of the rails. In FIG. 3, hydraulic cylinder 68 is connected to slidably move the plate member 43 respective to the tubular rails 45.

Figure 7:
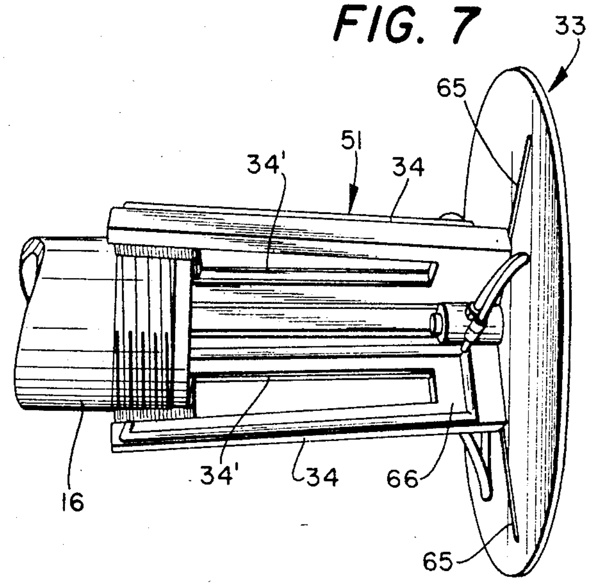
FIG. 7 is an enlarged, detail of part of the apparatus disclosed in FIG. 6, shown operatively associated with a pipe end.
Figure 8:
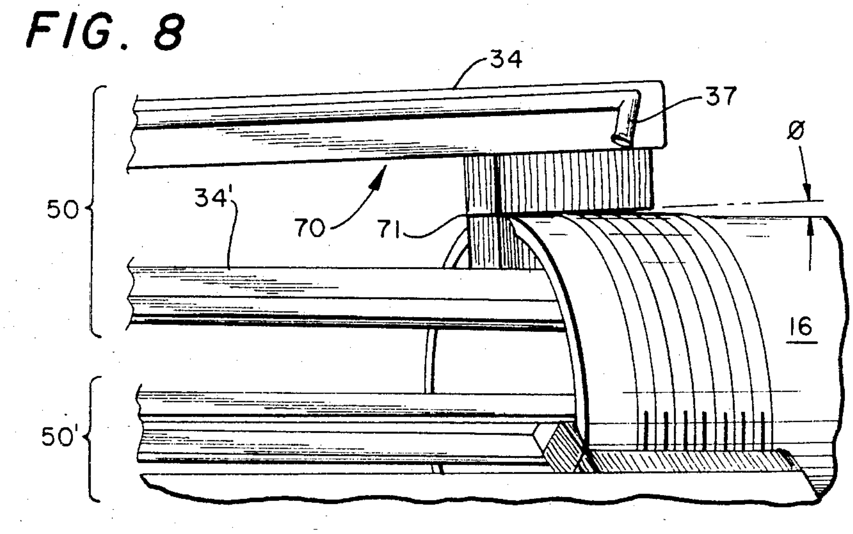
FIG. 8 is an enlarged, fragmentary, detailed view similar to the disclosure of FIG. 7.
Figure 9:
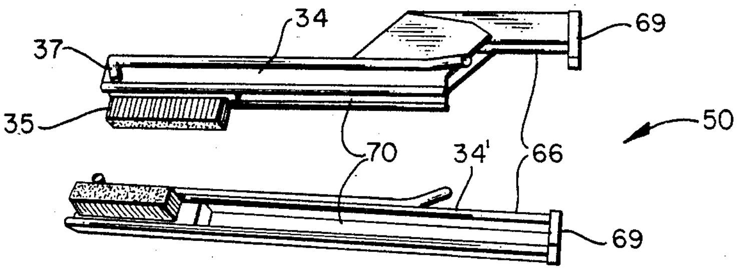
FIG. 9 is an enlarged, disassembled view showing additional details of part of the apparatus disclosed in the foregoing figures.

In FIGS. 8 and 9, together with other figures of the drawings, it will be noted that the fixed ends of the arms 34 are connected to a mount plate 69. In FIGS. 1, 2, 4–7, and 10, the pair of arms are joined near plate 69. The arms 34 preferably are cantilever arms fabricated from bending up a piece of metal into the illustrated complex new arm shape, thereby providing an outwardly opening cavity which receives the wooden handle of brushes 35 in a removable manner therewithin. The pockets 70 of the confronting pair of arms open towards one another. As best seen in FIG. 8, the near end 71 of adjacent confronting brushes contact one another, with the far ends thereof diverging from one another at an angle $\phi$ respective to the peripheral surface of the pipe being cleaned. The preferred angle is illustrated in the drawings.

Figure 11:
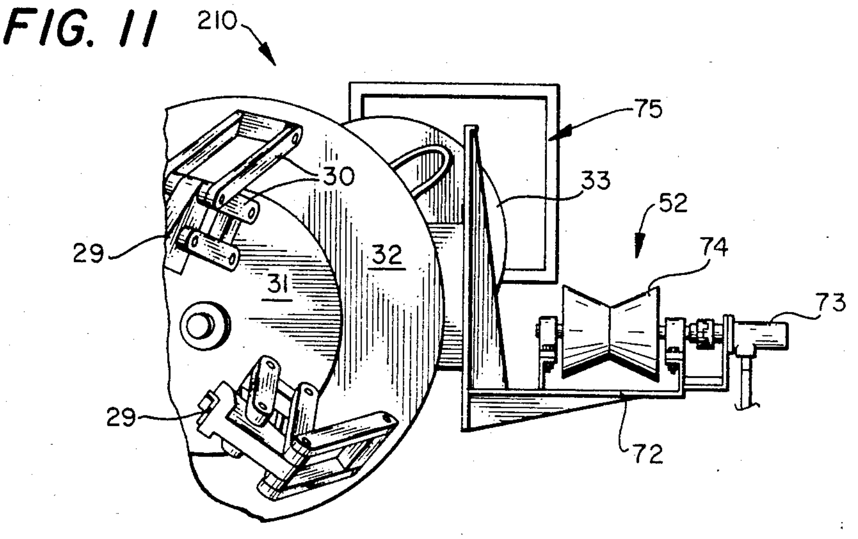
FIG. 11 is a fragmentary, end view of the apparatus disclosed in FIGS. 3 and 4; and, FIG. 12 is a broken, part diagrammatical, part schematical, top plan view of part of the apparatus disclosed in the foregoing figures.

In FIG. 11, there is disclosed the details of the before mentioned roller 74 which guidably supports a pipe thereon. The roller is supported by means of a mounting plate 72. The plate 72 is rigidly affixed to the main frame. Hydraulic motor 73 is provided with a suitable power fluid inlet and spent power fluid outlet. The motor 73 rotatably drives the V-shaped roller 74, to thereby propel a pipe supported thereon.

Numeral 75 of FIGS. 3 and 11 broadly illustrates one of two opposed spaced windows located in opposed walls of an enclosure within which the apparatus 10 resides. Each of the windows are axially aligned with the apparatus of the invention so that a pipe can be received through the enclosure which forms the two spaced apart windows.

Figure 12:
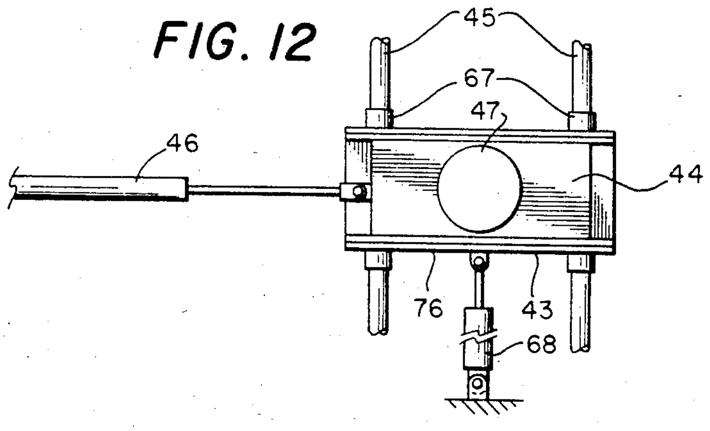

In FIG. 12, there is schematically illustrated the before mentioned superimposed plate members 43 and 44. As seen in FIG. 12, the plates are slidably captured respective to one another by means of opposed tracks 76 formed along the longitudinal extending edge portions of plate 43. Numeral 46 indicates the before mentioned hydraulic cylinder which moves plate 44 respective to plate 43 and thereby moves the entire apparatus laterally respective to the pipe. Hydraulic cylinder 68 moves plate member 43 respective to the tubular rails 45, thereby moving the entire apparatus longitudinally respective to the pipe axis.

OPERATION

In operation of the embodiment set forth in FIG. 1, a pipe 16 has a thread protector 14 attached to the opposed marginal terminal ends thereof. The pipe is positioned adjacent to the pipe protector remover apparatus 12 with the longitudinal axial centerline of the pipe coinciding with the longitudinal axial centerline 25 of the shaft 27. This aligned relationship of the pipe 16 and apparatus 10 is achieved by actuating the various hydraulic cylinders to move the apparatus vertically, laterally, and longitudinally as may be required. Hydraulic cylinders 79 is then actuated, causing plate members 31 and 32 to move towards one another, whereupon the circumferentially spaced apart jaws 29 releasably engage the protector 14. Motor 26 next turns shaft 27, thereby turning the plates 31, 32 and the jaws 29 which are attached thereto, whereupon the protector 14 is unscrewed from the threaded end of the pipe 16.

The main frame of the apparatus 10 is then moved away from the end of the pipe 16, and then the apparatus is rotated about pivot point 24 as the coupling is dropped into a suitable box. Rotation of the main frame continues until the thread cleaning apparatus 18 is positioned with the longitudinal axial centerline of the pipe 16 coinciding with the longitudinal axial centerline 25 of the apparatus 10. The thread cleaning apparatus 18 is advanced into operative engagement respective to the threaded pipe end, motor 26 is again energized while cleaning fluid flows from the indicated source, through swivel connection 28, through the piping 36, and out of the nozzle 37 as the pairs of brushes engage the inner and outer marginal end wall surfaces of the pipe. The rotating brush assembly cleans the threaded and inside marginal end of the pipe, with the residual cleaning fluid flowing back into a well or sump 78. The used cleaning fluid is pumped at P through filter F and back to the storage S. The apparatus 10 is again moved respective to the pipe, thereby releasing the brushes from the marginal end of the pipe. The apparatus 10 is again turned 180° and the opposed end 16' of the pipe is then treated in a similar manner.

In the embodiment of FIG. 2, the protector removal apparatus and the thread cleaning apparatus are positioned with the longitudinal axis 125, 125' arranged laterally and in the same horizontal plane respective to one another. In this instance, the apparatus 110 is moved laterally until centerline 125 coincides with the longitudinal axis of pipe 16. After the protector 14 has been removed from the pipe 16, the apparatus 110 is shifted laterally until the longitudinal axis 125' coincides with the longitudinal axis of the pipe, and the pipe end is then cleaned in the above described manner, after which the entire apparatus is rotated about pivot point 24' so that the opposite end of the pipe can be similarly treated.

After the threads at each opposed ends of the pipe have been treated in this manner, the pipe and threads are inspected for structural integrity and thereafter the threads are suitably preserved by application of a suitable preserving compound.

FIGS. 3–12 illustrate the preferred form of the invention. As seen illustrated in FIGS. 3 and 4, the pipe 16 enters the window 75 and is held stationary in close proximity of the apparatus 210, made in accordance with the present invention. The protector is removed from the pipe end by positioning the apparatus 210 with the longitudinal axis 25 thereof coinciding with the longitudinal axis of the pipe 16. This is achieved by cylinder 46 moving plate member 44 respective to plate member 43, hydraulic cylinder 68 moving plate member 43 respective to tubular rails 45, and the elevator 48 moving respective to the rigid column 47. At the same time, hydraulic motor 80 engages and rotates the gear 82, which is attached to the rotatable main frame. This action rotates the main frame in a horizontal plane about the vertical axis 24, which is also the vertical longitudinal axial centerline of the rigid column and the elevator.

After the protector remover 12 has been positioned in the above manner, cylinder 68 moves the main frame towards the pipe while the spaced plates 31, 32 move towards one another, causing the jaws to enclose and grasp the thread protector of the pipe. Motor 26 is energized, thereby rotating the jaws in the proper direction to unscrew the protector from the pipe end. Thereafter, cylinder 68 is again energized to move the main frame away from the pipe end. At the same time, motor 80 is energized to rotate the main frame 180°. The main frame is then again moved by cylinder 68 until the appropriate cleaning brushes engage the inner and outer surface of the pipe 16 in the manner set forth in FIGS. 7 and 8. The motor 58 is again energized, along with the cleaning fluid pump, so that cleaning fluid flows through the nozzles 37 as the brushes rotatably scrub and clean up the threaded end of the pipe.

After the threads of the pipe end have been cleaned, cylinder 68 is again energized to move the main frame away from the pipe end. Cylinder 46 is next engaged to move the main frame laterally away from the pipe so that roller 52 is brought into proper aligned relationship respective to the longitudinal axis of the pipe.

Next, the pipe is moved axially through the window 75, across the enclosure which forms the window 75, onto the support roller 74, and through a corresponding oppositely positioned window (not shown) where the opposed pipe end is positioned within the enclosure to thereby enable the other end of the pipe to be handled in the same before described manner respective to the apparatus 10, 110, and 210.

The above described sequence of events are again carried out, thereby cleaning the opposed end of the pipe. Usually it will be unnecessary to again adjust the elevation of the protector remover apparatus and the cleaning apparatus.

Often, the opposed ends of the pipe will be in the form of a box and pin, that is, male and female threaded connection wherein the female threaded connection is upset and internally threaded so that another identical pipe can be threadedly made up by placing the pin of one pipe within the box of the other pipe. In this instance, the cleaning apparatus 18 is adjusted whereby the pairs of brushes at 51 are of a small diameter for engaging the pin end of the pipe while the brush assembly at 50, FIGS. 4 and 5, is set at a diameter to engage the box end of the pipe. This enables the apparatus 18 to be oriented in the illustrated manner of FIG. 5, for example, so that the pin end of the pipe is cleaned, and thereafter, the apparatus is rotated in the manner of FIG. 6 so that the brushes 50 of plate 33', which are set for the large diameter threads, is in proper position to engage and clean the large diameter end of the pipe. This is achieved by engaging motor 54, thereby revolving the rotatable housing 56 180° about the vertical axis 57 as the entire main frame is reversed 180°. Stated differently, the main housing is reversed 180° to bring the cleaning apparatus 18 adjacent to the pipe end, while concurrently, the cleaning apparatus 18 is reversed 180° respective to the main frame so that the proper brush assembly 50 or 51 is positioned adjacent to the appropriate pipe end.

As illustrated in FIGS. 7 and 8, the near ends 71 of the pair of brushes are intermeshed with or contacting one another, with the surface of the brush being set at angle $\phi$ respective to the pipe surface. Consequently, the brush surfaces of the two confronting brushes diverge away from one another in a direction away from the apparatus.

As seen in FIG. 9, the arms 34 removably receive a standard wire brush 35 therewithin. The handle of the brush preferably is shortened, and the remaining part of the handle is driven into the illustrated channel, where the brush 35 is properly held in position by friction. The brush is removed by merely driving the shortened wooden handle outwardly from the channel and a new brush driven into place.

I claim:

1. A tool for sequentially removing a pipe protector and thereafter cleaning threads located on the opposed marginal ends of a pipe comprising:

a main frame, a shaft means supported in journaled relationship respective to said main frame, means for rotating said shaft means; an arm actuating member;

a plurality of arms, means by which said arms are connected to be rotated by said shaft means, a jaw connected to the distal end of each arm for releasably engaging a protector;

means for moving said main frame axially, laterally, and vertically respective to the longitudinal axis of said shaft means to thereby align said jaws for engagement with said protector;

means for pivotally moving said arms in response to movement of said arm actuating member to cause said jaws to move radially from a protector releasing into a protector engaging position;

a cleaning tool mounted to said main frame for engaging and cleaning the opposed marginal ends of a pipe, said tool includes a horizontal shaft having opposed ends, a first and second opposed plate member having central axis thereof attached to said horizontal shaft, means for imparting rotational motion into said horizontal shaft so that said plate member rotates about the central axis thereof;

a vertical shaft means, a support means attached to said main framework for supporting said vertical shaft means for rotation about the longitudinal axis thereof; journal means by which a medial length of said horizontal shaft is rotatably supported by said vertical shaft; so that said horizontal shaft ends can be rotated about said vertical shaft means to describe a plane within which the horizontal shaft lies;

a plurality of cleaning brushes, means mounting said brushes on said first and second plate members, said brushes on each plate member are radially positioned respective to said horizontal shaft and circumferentially arranged respective to one another, means for adjustably positioning said brushes of each plate member respective to one another; the brushes located on a face of one plate member are positioned in opposition to the brushes located on the face of the other plate member; means for rotating said vertical shaft about the longitudinal axis thereof, thereby rotating the horizontal shaft in a horizontal plane and reversing the relationship of the first and second plate members respective to one end of the main frame, whereby; the brushes located on one plate member can engage and clean external pipe threads, while the brushes on the other plate member can engage and clean internal pipe threads.

2. The device set forth in claim 1 wherein said cleaning brushes include a first brush means arranged along a first radius for engaging the inner wall surface of a pipe, and a second brush means arranged along a second radius for engaging the outer threaded wall surface of a pipe, said first and second brush means are arranged in opposition to one another and confront one another in a manner to simultaneously engage the inner and outer wall surface of a pipe.

3. The apparatus set forth in claim 1 and further including a flow conduit connected to conduct cleaning fluid onto the brushes.

4. The tool of claim 1 and further including means by which said cleaning tool and said protector removal tool are arranged along a common longitudinal axis so that the main frame can be rotated about a vertical axis to change the relationship of the protector remover tool and the cleaning tool.

5. The apparatus recited in claim 1 wherein said cleaning brushes on one said plate member include a first brush means arranged along a first radius for engaging the inner wall surface of a pipe; and, a second brush means mounted on said second plate member and arranged along a second radius for engaging the outer wall surface of a pipe, said first and second brush means are arranged in opposition to one another and confront one another in a manner to simultaneously engage the inner and outer wall surfaces of a pipe;

a further including a flow conduit connected to conduct cleaning fluid onto the brushes.

6. The apparatus of claim 5 and further including means for arranging said cleaning tool and said protector removal tool along a common longitudinal axis so that the main frame can be rotated about a vertical axis to change the relationship of the tools relative to a pipe to be cleaned.

7. The tool apparatus of claim 1 wherein said cleaning brushes include a first brush means arranged along a first radius for engaging the inner wall surface of a pipe, and a second brush means arranged along a second radius for engaging the outer threaded wall surface of a pipe, said first and second brush means are arranged in opposition to one another and confront one another in a manner to simultaneously engage the inner and outer wall surfaces of a pipe;

and further including means forming a flow conduit connected to conduct cleaning fluid onto the brushes;

and further including means for arranging said cleaning tool and said protector removal tool along a common longitudinal axis so that the main frame can be rotated about a vertical axis to change the relationship of the tools.

8. A tool for cleaning threads located on the opposed marginal ends of a pipe, comprising: a main framework, a horizontal shaft having opposed ends, a first and second brush mounting surface opposed to one another, each said surface having the central axis thereof attached to said horizontal shaft; means for imparting rotational motion into said shaft so that each said mounting surface rotates about the central axis thereof;

a vertical shaft means, a support means attached to said main framework for supporting said vertical shaft means for rotation about the longitudinal axis thereof; journal means by which a medial length of said horizontal shaft is rotatably supported by said vertical shaft; so that said horizontal shaft can be rotated about said vertical shaft means to describe a plane within which the horizontal shaft lies;

a plurality of cleaning brushes, means mounting said brushes on said first and second mounting surfaces, said brushes on each mounting surface are radially positioned respective to said horizontal shaft and circumferentially arranged respective to one another, means for adjustable positioning said brushes of each mounting surface respective to one another; the brushes located on one mounting surface are positioned in opposition to the brushes located on the other mounting surface; means for rotating said vertical shaft about the longitudinal axis thereof, thereby rotating the horizontal shaft in a horizontal plane and reversing the relationship of the first and second mounting surfaces respective to one end of the main frame, whereby:

the brushes located on one mounting surface can engage and clean external pipe threads, while the brushes on the other mounting surface can engage and clean internal pipe threads.

9. The apparatus defined in claim 8 wherein said means for imparting rotational motion into the horizontal shaft is a motor having a shaft connected to said horizontal shaft, said motor has a housing which provides the means by which said horizontal shaft is journaled to said vertical shaft;

said support means is a housing having one end thereof affixed to said main framework; a second journal means by which said vertical shaft is rotatably mounted within the last recited housing so that said motor can be rotated respective to said housing to thereby enable the horizontal shaft to be rotated 180° in a plane which is perpendicular to the vertical shaft to thereby reverse the relationship of the mounting surfaces.

10. The device recited in claim 8 wherein said mounting surfaces are spaced plate members, each said plate member includes opposed faces, circumferentially spaced radial slots formed in said opposed faces, said brushes being mounted for slidable movement along said slots, means by which said brushes are extended away from said plate member;

the brushes mounted on one plate member being oriented towards the axial centerline of the horizontal shaft for engaging and cleaning the external threads of a pipe;

the brushes mounted on the other plate member being oriented away from the axial centerline of the horizontal shaft for engaging and cleaning the internal threads of a pipe.

11. The device recited in claim 10 and further including pairs of brushes circumferentially arranged about said plate member, each brush of a pair have a cleaning side arranged in facing relationship respective to one another to thereby enable a pair of brushes to simultaneously engage and clean both the inner and outer surfaces of a marginal pipe end.

12. The tool of claim 8 wherein said means for imparting rotational motion into said shaft is a motor having a shaft from which an opposed shaft end extends to provide the means by which horizontal shaft is journaled to said support means;

said support means is a housing having one end thereof affixed to said main framework; journal means by which said vertical shaft is rotatably mounted to the other end of the housing so that said motor can be rotated respective to said housing to thereby enable the shaft to be rotated 180 degrees in a plane which is perpendicular to the vertical shaft to thereby reverse the relationship of the mounting surfaces;

wherein each said mounting surface is a plate member, said plate member includes opposed faces, radial slots formed in said opposed faces, said brushes include pairs of brushes which are mounted for slidable movement along said slots, means by which said brushes extend away from said plate member; said brushes have the cleaning surfaces thereof oriented towards one another;

the pairs of brushes mounted on one plate member being oriented about a relatively small diameter circle for engaging and cleaning a relatively small diameter end of a pipe;

the brushes mounted on the other plate member being oriented along a relatively large diameter circle for engaging and cleaning a relatively large diameter end of a pipe.

13. Apparatus for sequentially removing a pipe thread protector from the end of a pipe and thereafter cleaning the internal and external surfaces at the pipe threads located at the box and pin end of a pipe joint, comprising: means forming two rotatable mount members, spaced cleaning members, there being a plurality of said cleaning members secured to each of said mount members, said cleaning members including a plurality of cleaning elements which are circumferentially disposed about a center of the mount member to which said cleaning member is attached;

adjustment means by which each of said cleaning members can be moved towards and away from said center to thereby enable the cleaning members to engage and clean the marginal ends of pipe of various different diameters;

means mounting said mount members in spaced axial aligned relationship respective to a horizontally disposed rotatable shaft such that the cleaning members on said mount members are diametrically opposed to one another; motor means for rotating said rotatable shaft; vertical support means connected for reversing the relationship of said mount members so that one cleaning member can engage one end of the pipe, and thereafter the relationship of the mount members can be reversed, thereby enabling the other cleaning member to engage the other end of the pipe, so that the opposed ends of the pipe are sequentially cleaned;

a pipe thread protector remover apparatus arranged in spaced relationship respective to said mount members, means for concurrently moving the first and last said apparatus vertically, laterally, and longitudinally respective to the end of a pipe placed in proximity of the apparatus.

14. The cleaning apparatus of claim 13 wherein said adjustment means for moving said cleaning elements include a plurality of radial slots formed within said rotatable mount members, there being one said cleaning element for each said slot;

fastener means by which one cleaning element is adjustably affixed to one said slot so that the cleaning elements are radially spaced about said center.

15. The cleaning apparatus of claim 14 wherein said means mounting said mount members is a common shaft having a journal means at a medial part thereof by which the shaft imparts rotation into the mount members; a frame, a motor support housing by which the journaled shaft is supported from said frame, and means for moving the shaft ends about the support housing to describe a plane which is parallel to the shaft.

* * * * *

UNITED STATES PATENT AND TRADEMARK OFFICE
CERTIFICATE OF CORRECTION

PATENT NO. : 4,593,451

DATED : June 10, 1986

INVENTOR(S) : ROYCE G. ROBERTS

It is certified that error appears in the above-identified patent and that said Letters Patent is hereby corrected as shown below:

Column 1, line 30, delete "a" before box;
Line 50, substitute --ends-- for "end";
Column 2, line 8, substitute --toward-- for "towards";
Line 10, substitute --sizes-- for "size";
Line 11, substitute --is-- for "are";
Line 25, substitute --are-- for "is";
Line 27, substitute --are-- for "is", both occurrences;
Column 6, line 5, substitute --extend-- for "extends";
Column 7, line 9, substitute --are-- for "is";
Column 8, line 44, insert --a-- before "male";
Line 58, substitute --are-- for "is";
Column 9, line 17, insert --thread-- before "protector";
Line 42, insert --each-- after "that";

UNITED STATES PATENT AND TRADEMARK OFFICE
CERTIFICATE OF CORRECTION

PATENT NO. : 4,593,451

DATED : June 10, 1986

INVENTOR(S) : ROYCE G. ROBERTS

It is certified that error appears in the above-identified patent and that said Letters Patent is hereby corrected as shown below:

Column 10, line 9, delete "threaded" after outer;
Line 33, substitute --and-- for "a", first occurrence;
Line 45, delete "threaded" after outer;
Column 12, line 35, insert --a horizontal disposed rotatable shaft,-- before "means";
Line 36, delete "a horizontally";
Line 37, substitute --said-- for "disposed";
Line 38, substitute --the spaced-- for "said"; and delete "diametrically".

Signed and Sealed this

Seventh Day of October, 1986

[SEAL]

*Attest:*

DONALD J. QUIGG

*Attesting Officer*

*Commissioner of Patents and Trademarks*